(12) United States Patent
Ogawa et al.

(10) Patent No.: US 6,451,931 B1
(45) Date of Patent: Sep. 17, 2002

(54) REACTION PRODUCT OF PRIMARY AND TERTIARY AMINE-CONTAINING COMPOUND, DIHYDRAZIDE AN POLYISOCYANATE

(75) Inventors: Akio Ogawa; Manabu Abe, both of Saitama-ken (JP)

(73) Assignee: Asahi Denki Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/750,129

(22) Filed: Dec. 29, 2000

(51) Int. Cl.[7] .................. C08G 18/32; C08L 33/14; C08L 63/02; C08L 63/04
(52) U.S. Cl. ................. 525/452; 528/68; 528/73; 528/118; 528/121; 528/122; 528/123; 528/124
(58) Field of Search .......................... 525/452

(56) References Cited

FOREIGN PATENT DOCUMENTS

| EP | 0 452 866 A2 | 10/1991 |
|----|--------------|---------|
| JP | 56-155222 | 12/1981 |
| JP | 57-100127 | 6/1982 |
| JP | 59-53526 | 3/1984 |
| JP | 62-112676 A | 5/1987 |
| JP | 3-296525 | 12/1991 |
| JP | 05-155973 A | 6/1993 |
| JP | 2001-031738 | 2/2001 |

Primary Examiner—Robert E. L. Sellers
(74) Attorney, Agent, or Firm—Young & Thompson

(57) ABSTRACT

A curing agent composition for an epoxy resin which comprises (B) a reaction product obtained from (a) an amine compound represented by formula (I):

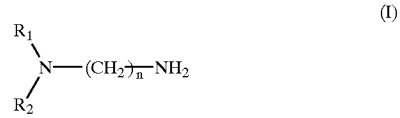

wherein $R_1$ and $R_2$ each represent an alkyl group having 1 to 8 carbon atoms, of $R_1$ and $R_2$ are connected together to form an alkylene group which may contain an oxygen atom or a nitrogen atom; and n represents 1 to 6,
(b) a polyamine compound comprising a dicarboxylic acid dihydrazide, (c) an organic polyisocyanate, and, optionally; (d) an epoxy compound.

7 Claims, No Drawings

REACTION PRODUCT OF PRIMARY AND TERTIARY AMINE-CONTAINING COMPOUND, DIHYDRAZIDE AN POLYISOCYANATE

BACKGROUND OF THE INVENTION

1. Field of the Invention

The present invention relates to a curing agent composition for an epoxy resin and a curing epoxy resin composition. More particularly, it relates to a curing agent composition which is combined with a polyepoxy compound to provide a one-pack type heat-curable epoxy resin composition which is excellent in storage stability, curability and adhesion and of which a cured product has excellent physical properties; and a one-pack type heat-curable epoxy resin composition comprising the curing agent composition and a polyepoxy compound.

2. Description of Related Art

An epoxy resin exhibits excellent adhesion to various substrates. A cured epoxy resin is relatively excellent in heat resistance, chemical resistance, electrical characteristics and mechanical characteristics and has been in general use in broad applications, particularly in the field of coatings and adhesives.

Two-pack type epoxy resin compositions, which require addition of a curing agent or a cure accelerator immediately before use, have prevailed. A two-pack system is characterized by curability at ambient or low temperature but involves measuring and mixing immediately before use. Besides, once mixed, the curing composition has a short pot life and has difficulty in applying to automated machinery. A one-pack type curing epoxy resin composition free from such restrictions of use has been demanded.

A curing agent which does not react at room temperature but commences reacting on heat application, i.e., a latent curing agent is indispensable for formulating a one-pack type curing resin composition. Latent curing agents proposed to date include dicyandiamide, dibasic acid dihydrazides, boron trifluoride-amine complex salts, guanamines, melamine, and imidazoles. A mixture of an epoxy resin and dicyandiamide, melamine or a guanamine compound has satisfactory storage stability but requires a high curing temperature (150° C. or higher) and a long curing time. A combined use of a cure accelerator has been introduced widely to shorten the curing time, which results in considerable reduction of storage stability. A mixture of an epoxy resin and a dibasic acid dihydrazide or an imidazole compound is curable in relatively low temperatures but poor in storage stability. Although a mixture of an epoxy resin and a boron trifluoride-amine complex salt has high storage stability and needs a shorter curing time, the cured product has poor water resistance and corrodes metal.

In order to overcome these problems, it has been proposed to use, as a curing agent for an epoxy resin, a reaction product between a dialkylamine and an epoxide (see Japanese Patent Laid-Open Nos. 56-155222 and 57-100127) or a reaction product between a tertiary amino-containing alcohol or phenol and a polyepoxide (see Japanese Patent Laid-Open No. 59-53526). The curing compositions containing these curing agents, however, still have insufficient storage stability, and their cured products are unsatisfactory in physical properties.

Japanese Patent Laid-Open No. 3-296525 teaches use of a curing agent obtained by heat reaction of an N,N-dialkylaminoalkylamine, a cyclic amine, and a diisocyanate. The storage stability achieved with this curing agent is still unsatisfactory however.

SUMMARY OF THE INVENTION

An object of the present invention is to provide a one-pack type curing epoxy resin composition excellent in storage stability, curing properties, and adhesive properties and capable of providing a cured product with excellent physical properties.

The present inventors have conducted extensive investigation and have found, as a result, that a curing epoxy resin composition meeting the above object can be obtained by using a latent curing agent prepared from an N,N-dialkylaminoalkylamine, a dicarboxylic acid dihydrazide, and an organic polyisocyanate.

The present invention provides a curing agent composition for an epoxy resin, which comprises (B) a reaction product obtained by allowing to react (a) a monoamine compound comprising an amine compound represented by formula (I):

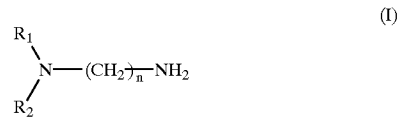

wherein $R_1$ and $R_2$ each represent an alkyl group having 1 to 8 carbon atoms, or $R_1$ and $R_2$ are connected together to form an alkylene group which may contain an oxygen atom or a nitrogen atom; and n represents 1 to 6, (b) a polyamine compound comprising a dicarboxylic acid dihydrazide, (c) an organic polyisocyanate, and, if desired, (d) an epoxy compound.

The present invention also provides a curing agent composition for an epoxy resin, which comprises (B) the above-described reaction product and (C) an epoxy adduct of an amine compound.

The present invention also provides a one-pack type heat-curing epoxy resin composition comprising (A) a polyepoxy compound and (B) the above-described reaction product.

The present invention further provides a one-pack type heat-curing epoxy resin composition comprising (A) a polyepoxy compound, (B) the above-described reaction product, and (C) an epoxy adduct of an amine compound.

The epoxy resin composition according to the present invention is a one-pack type curing system which is excellent in storage stability as well as curing properties, adhesive properties, and cured resin physical properties.

DETAILED DESCRIPTION OF THE INVENTION

The monoamine compound as component (a) which can be used in the present invention comprises an N,N-dialkylaminoalkylamine represented by formula (I):

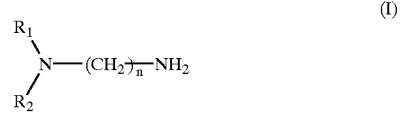

wherein $R_1$ and $R_2$ each represent an alkyl group having 1 to 8 carbon atoms, or $R_1$ and $R_2$ are connected together to form an alkylene group which may contain an oxygen atom or a nitrogen atom; and n represents 1 to 6.

The monoamine compound (a) can further comprise other monoamine compounds, such as benzylamine and cyclohexylamine.

In formula (I), the alkyl group as represented by $R_1$ or $R_2$ includes methyl, ethyl, propyl, butyl, pentyl, hexyl, heptyl and octyl groups. When taken together, $R_1$ and $R_2$ can represent an alkylene group which may contain an oxygen atom or a nitrogen atom. For example, $R_1$ and $R_2$ can be taken together with the nitrogen atom to which they are bonded to form a heterocyclic ring, such as a morpholine ring, a piperidine ring or a piperazine ring.

The N,N-dialkylaminoalkylamine of formula (I) includes N,N-dimethylaminopropylamine, N,N-diethylaminopropylamine, N,N-dipropylaminopropylamine, N,N-dibutylaminopropylamine, N,N-dimethylaminoethylamine, N,N-diethylaminoethylamine, N,N-dimethylaminobutylamine, aminopropylmorpholine, aminoethylpiperidine, and 1-(2-aminoethyl)-4-methylpiperazine.

The polyamine compound as component (b) which can be used in the present invention comprises a dicarboxylic acid dihydrazide. The dicarboxylic acid dihydrazide includes oxalic acid dihydrazide, malonic acid dihydrazide, succinic acid dihydrazide, glutaric acid dihydrazide, adipic acid dihydrazide, suberic acid dihydrazide, azelaic acid dihydrazide, sebacic acid dihydrazide, and phthalic acid dihydrazide.

The polyamine compound as compound (b) can further comprise other polyamine compounds, such as diethylenetriamine, triethylenetetramine, tetraethylenepentamine, 1,2-diaminopropane, 1,2-diaminocyclohexane, 1,4-diamino-3,6-diethylcyclohexane, isophoronediamine, m-xylylenediamine, diaminodiphenylmethane, diaminodiphenylsulfone, and piperazine.

In using the dicarboxylic acid dihydrazide in combination with other polyamine compounds as component (b), the amount of the other polyamine compound(s) is preferably not more than 5 mol, particularly not more than 3 mol, per mole of the dicarboxylic acid dihydrazide. Use of more than 5 mol of the other polyamine compounds is apt to reduce the storage stability.

A molar ratio of components (b) to (a) is 0.01 to 5, preferably 0.1 to 3. Outside this range, there is possibility that the storage stability or other properties such as curability and adhesion may be reduced.

The organic polyisocyanate which can be used in the present invention as component (c) includes aliphatic, alicyclic or aromatic polyisocyanate compounds. Examples of useful component (c) are 1,3-bisisocyanate methylcyclohexane, 2,4-tolylene diisocyanate, 2,6-tolylene diisocyanate, 4,4'-diphenylmethane diisocyanate, phenylene diisocyanate, xylylene diisocyanate, tetramethylxylylene diisocyanate, tetramethylene diisocyanate, hexamethylene diisocyanate, lysine diisocyanate ester, 1,4-cyclohexylene diisocyanate, 4,4'-dicyclohexylmethane diisocyanate, 3,3'-dimethoxy-4,4'-biphenylene diisocyanate, 1,5-naphthalene diisocyanate, 1,5-tetrahydronaphthalene diisocyanate, and isophorone diisocyanate.

Component (c) is used in an amount corresponding to 0.1 to 2 NCO groups, preferably 0.5 to 1 NCO group, per $NH_2$ group of the total amine compounds (i.e., components (a) and (b)). If the number of NCO is less than 0.1, the storage stability tends to decrease. If it exceeds 2, the storage stability tends to decrease, and the curability and the adhesive properties may be affected adversely.

In preparing the reaction product (B) from components (a), (b) and (c), an epoxy compound (d) can be used in combination to achieve modification by epoxy addition. Useful epoxy compounds as component (d) include polyglycidyl ethers, such as bisphenol A and bisphenol F; polyepoxy compounds, such as tetraglycidyl m-xylylenediamine, diglycidylaniline, and diglycidyl o-toluidine; and monoepoxy compounds, such as phenyl glycidyl ether, methylphenyl glycidyl ether, and butylphenyl glycidyl ether.

Component (d) is used in an amount corresponding to 0.9 epoxy group, preferably 0.01 to 0.5 epoxy group, per $NH_2$ group of the total amine compounds (i.e., components (a) and (b)). If the number of the epoxy groups exceeds 0.9/$NH_2$, the curability is liable to reduce.

In addition to the above-described component (B), the curing agent composition for an epoxy resin according to the present invention can further comprise (C) an epoxy adduct of an amine compound obtained from (e) an amine compound and (f) an epoxy compound.

The amine compound (e) which provides the epoxy adduct as component (C) preferably comprises the amine compound represented by formula (I). The amine compound of formula (I) can be used in combination with other amine compounds, such as monoamines, e.g., benzylamine and cyclohexylamine; and polyamines, e.g., diethylenetriamine, triethylenetetramine, tetraethylenepentamine, 1,2-diaminopropane, 1,2-diaminocyclohexane, 1,4-diamino-3, 6-diethylcyclohexane, isophoronediamine, m-xylylenediamine, diaminodiphenylmethane, diaminodiphenylsulfone, and piperazine.

The epoxy compound (f) which provides the amine-epoxy adduct (C) includes those enumerated above as component (d). The epoxy compound (f) is preferably used in an amount corresponding to 0.5 to 2 epoxy groups per $NH_2$ of the amine compound (e).

The curing agent composition for epoxy resins according to the present invention can be prepared in any method. For example, it is prepared by (1) a method comprising mixing the monoamine compound (a) and the polyamine compound (b) in an organic solvent and slowly adding the polyisocyanate compound (c) to the mixture to allow (c) to react with (a) and (b); (2) a method comprising mixing the monoamine compound (a) and the polyamine compound (b) in an organic solvent, slowly adding the polyisocyanate compound (c) to the mixture to allow (c) to react with (a) and (b), and adding the amine compound (e) and the epoxy compound (f) to cause further reaction; (3) a method comprising mixing the monoamine compound (a) and the polyamine compound (b) in an organic solvent, slowly adding the epoxy compound (d) to the mixture to allow (d) to react with (a) and (b), and adding the polyisocyanate compound (c) to cause further reaction; or (4) a method comprising mixing the monoamine compound (a) and the polyamine compound (b) in an organic solvent, slowly adding the polyisocyanate compound (c) to the mixture to allow (c) to react with (a) and (b), and mixing therewith an adduct of the amine compound (e) and the epoxy compound (f).

The organic solvent which can be used in the reactions includes ketones, such as methyl ethyl ketone, methyl amyl ketone, diethyl ketone, acetone, methyl isopropyl ketone, propylene glycol monomethyl ether acetate, and cyclohexane; ethers, such as tetrahydrofuran, 1,2-dimethoxyethane, and 1,2-diethoxyethane; esters, such as ethyl acetate and n-butyl acetate; ether esters, such as propylene glycol monomethyl ether acetate; alcohols, such as isobutanol, n-butanol, isopropyl alcohol, n-propanol, and amyl alcohol; aromatic hydrocarbons, such as benzene, toluene or xylene; terpene hydrocarbon oils, such as turpentine oil, D-limonene, and pinene; paraffinic solvents, such as mineral spirit, Swazol #310 (available from Cosmo Matsuyama Oil Co., ltd.), and Solvesso #100 (available from Exxon Chemical); halogenated aliphatic hydrocarbons, such as carbon tetrachloride, chloroform, trichloroethylene, and methylene chloride; halogenated aromatic hydrocarbons, such as chlorobenzene; aniline, triethylamine, pyridine, dioxane, acetic acid, acetonitrile, carbon disulfide, and the like.

The curing agent composition of the present invention provides a one-pack type heat-curable epoxy resin composition when combined with (A) a polyepoxy compound.

The polyepoxy compound which can be used in the present invention as component (A) includes:

- polyglycidyl ether compounds of mononucleic polyhydric phenol compounds, such as hydroquinone, resorcinol, pyrocatechol, and phloroglucucinol;
- polyglycidyl ether compounds of polynucleic polyhydric phenol compounds, such as dihydroxynaphthalene, biphenol, methylene bisphenol (bisphenol F), methylenebis(o-cresol), ethylidenebisphenol, isopropylidenebisphenol (bisphenol A), isopropylidenebis(o-cresol), tetrabromobisphenol A, 1,3-bis(4-hydroxycumylbenzene), 1,4-bis(4-hydfoxycumylbenzene), 1,1,3-tris(4-hydroxyphenyl) butane, 1,1,2,2-tetra(4-hydroxyphenyl)ethane, thiobisphenol, sulfobisphenol, oxybisphenol, phenol novolak, o-cresol novolak, ethylphenol novolak, butylphenol novolak, octylphenol novolak, resorcin novolak, and terpene diphenol;
- polyglycidyl ethers of polyhydric alcohols, such as ethylene glycol, propylene glycol, butylene glycol, hexanediol, polyglycols, thiodiglycol, glycerol, trimethylolpropane, pentaerythritol, sorbitol, and a bisphenol A-ethylene oxide adduct;
- homo- or copolymers of glycidyl methacrylate and glycidyl esters of aliphatic, aromatic or alicyclic polybasic acids, such as maleic acid, fumaric acid, itaconic acid, succinic acid, glutaric acid, suberic acid, adipic acid, azelaic acid, sebacic acid, a dimer acid, a trimer acid, phthalic acid, isophthalic acid, terephthalic acid, trimellitic acid, trimesic acid, pyromellitic acid, tetrahydrophthalic acid, hexahydrophthalic acid, and endomethylenetetrahydrophthalic acid; epoxy compounds having a glycidylamino group, such as N,N-diglycidylaniline and bis(4-N-methyl-N-glycidylamino)phenyl)methane.

The curing agent composition of the present invention is usually used in an amount of 0.1 to 200 parts by weight, preferably 1 to 100 parts by weight, per 100 parts by weight of the polyepoxy compound (A). If the amount of the curing agent composition is less than 0.1 part, the resin composition may fail to cure. If it exceeds 200 parts, the resulting cured product tends to have reduced physical properties.

If desired, the curing epoxy resin composition of the present invention may comprise known curing agents for epoxy resins in addition to components (B) and (C). Useful known curing agents include the polyamines enumerated as component (e); a polyepoxy-addition modified product obtained by allowing the polyamine enumerated as component (e) to react with an epoxy resin, such as a glycidyl ether (e.g., phenyl glycidyl ether, butyl glycidyl ether, bisphenol A diglycidyl ether, and bisphenol F diglycidyl ether) or a glycidyl ester of a carboxylic acid; amido-modified products obtained by allowing these organic polyamines to react with carboxylic acids, such as phthalic acid, isophthalic acid, and a dimer acid, in a usual manner; and Mannich reaction products obtained by the reaction between these polyamines and aldehydes (e.g., formaldehyde) or phenols having at least one site capable of becoming an aldehyde on the nucleus, such as phenol, cresol, xylenol, t-butylphenol and resorcinol, in a usual manner. Known latent curing agents, such as dicyandiamide, melamine, guanamine, acid anhydrides, dicarboxylic acid dihydrazides, and imidazoles, are also useful in combination.

Where the epoxy resin composition of the present invention is used as a coating or an adhesive, a solvent is usually used to make it easy to handle the composition. Suitable solvents for this use include ketones, such as methyl ethyl ketone, methyl amyl ketone, diethyl ketone, acetone, methyl isopropyl ketone, propylene glycol monomethyl ether acetate, and cyclohexanone; ethers, such as tetrahydrofuran, 1,2-dimethoxyethane, and 1,2-diethoxyethane; esters, such as ethyl acetate and n-butyl acetate; ether esters, such as propylene glycol monomethyl ether acetate; alcohols, such as isobutanol, n-butanol, isopropyl alcohol, n-propanol, and amyl alcohol; aromatic hydrocarbons, such as benzene, toluene, and xylene; terpene hydrocarbon oils, such as turpentine oil, D-limonene, and pinene; paraffinic solvents, such as mineral spirit, Swazol #310 (available from Cosmo Matsuyama Oil Co., Ltd.), Solvesso #100 (available from Exxon Chemical), halogenated aliphatic hydrocarbons, such as carbon tetrachloride, chloroform, trichloroethylene, and methylene chloride; halogenated aromatic hydrocarbons, such as chlorobenzene; aniline, triethylamine, pyridine, dioxane, acetic acid, acetonitrile, carbon disulfide, and the like.

If desired, the epoxy resin composition of the present invention can further contain additives commonly employed in the art. Useful additives include curing catalysts; reactive or non-reactive diluents (plasticizers), such as monoglycidyl ethers, dioctyl phthalate, dibutyl phthalate, benzyl alcohol, and coal tar; fillers or pigments, such as glass fiber, carbon fiber, cellulose, silica sand, cement, kaolin, clay, aluminum hydroxide, bentonite, talc, silica, silica powder, titanium dioxide, carbon black, graphite, iron oxide, and bituminous substances; thickeners; thixotropic agents; flame retardants; defoaming agents; anti-rusting agents; colloidal silica and colloidal alumina. The epoxy resin composition may further comprise self-adhesive resins, such as xylene resins and petroleum resins.

The curing epoxy resin composition of the present invention is useful in a broad range of applications, such as coatings or adhesives applied to concrete, cement mortar, metals, leather, glass, rubber, plastics, wood, fabric, paper, etc.; self-adhesives of adhesive tapes for packaging, adhesive labels, frozen food labels, strippable labels, POS labels, adhesive-backed wall paper, and adhesive-backed flooring; art paper, coated paper, cast coated paper, coated paperboards, carbonless copying paper, and impregnated paper; textile assistants for natural fiber, synthetic fiber, glass fiber, carbon fiber, metal fiber, etc., such as sizes, antifraying agents, and other processing aids; automotive applications such as body sealers and chipping primers; and constructive materials such as sealing compounds, admixtures for cement, and waterproof admixtures. It is particularly suitable as coatings and adhesives on various substrates.

The curing agent compositions and epoxy resin compositions of the present invention will be illustrated in greater detail with reference to Preparation Examples and Examples, but it should be understood that the invention is not construed as being limited thereto. Unless otherwise noted, all the percents and ratios are by weight.

PREPARATION EXAMPLE 1

Curing Agent Composition of Example 1-1

A reactor was charged with 162.5 g of isobutanol, 162.5 g of xylene, 204 g (2 mol) of N,N-dimethylaminopropylamine, 87 g (0.5 mol) of adipic acid dihydrazide, and 85 g (0.5 mol) of isophoronediamine, and the mixture was stirred at 60 to 70° C. for 30 minutes. To the mixture was added dropwise 666 g of a 67% xylene solution of isophorone diisocyanate (2 mol). After the dropwise addition, the temperature was raised to 140 to 150° C., at which the mixture was aged under reflux for 2 hours. After confirming disappearance of the IR absorption at 2250 cm$^{-1}$ assigned to an isocyanate, the temperature was further elevated up to 200° C., at which the solvent was removed under atmospheric pressure for 2 hours. The solvent was further removed at 190 to 200° C. under reduced pressure of 50 to 60 mmHg for 1 hour to give a pale white solid.

PREPARATION EXAMPLES 2 TO 11

Curing Agent Compositions of Examples 1-2 to 1-10 and Comparative Example 1

Curing agent compositions were prepared according to the formulations shown in Tables 1 to 3 in the same manner as in Preparation Example 1.

PREPARATION EXAMPLE 12

Curing Agent Composition of Example 1-11

A reactor was charged with 162.5 g of isobutanol, 162.5 g of xylene, 204 g (2 mol) of N,N-dimethylaminopropylamine, 87 g (0.5 mol) of adipic acid dihydrazide, and 85 g (0.5 mol) of isophoronediamine, and the mixture was stirred at 60 to 70° C. for 30 minutes. To the mixture was added dropwise 666 g of a 67% xylene solution of isophorone diisocyanate (2 mol). After the dropwise addition, the temperature was raised to 140 to 150° C., at which the mixture was aged under reflux for 2 hours. After confirming disappearance of the IR absorption at 2250 cm$^{-1}$ assigned to an isocyanate, 116 g (1 mol) of hexamethylenediamine and 204 g (2 mol) of dimethylaminopropylamine were added to the reaction mixture, followed by stirring at 120° C. for 30 minutes. To the mixture was slowly added dropwise 540 g (2 mol) of diglycidyl o-toluidine. After the addition, the temperature was raised to 140 to 150° C., at which the mixture was refluxed for 2 hours. The temperature was further elevated up to 200° C., at which the solvent was removed under atmospheric pressure for 2 hours. The solvent was further removed at 190 to 200° C. under reduced pressure of 50 to 60 mmHg for 1 hour to give a pale white solid.

PREPARATION EXAMPLES 13 AND 15

Curing Agent Compositions of Examples 1-12 and 1-14

Curing agent compositions were prepared according to the formulations shown in Table 2 in the same manner as in Preparation Example 11.

PREPARATION EXAMPLE 16

Curing Agent Composition of Example 1-15

A reactor was charged with 162.5 g of isobutanol, 162.5 g of xylene, 408 g (4 mol) of N,N-dimethylaminopropylamine, 174 g (1 mol) of adipic acid dihydrazide, and 170 g (1 mol) of isophoronediamine, and the mixture was stirred at 60 to 70° C. for 30 minutes. To the mixture were successively added dropwise 486 g (1.8 mol) of diglycidyl o-toluidine (epoxy equivalent: 135) and 40 g (0.1 mol) of tetraglycidyl m-xylylenediamine (epoxy equivalent: 100), followed by refluxing for 2 hours for aging. To the mixture was added dropwise 666 g of a 67% xylene solution of isophorone diisocyanate (2 mol). After the addition, the temperature was raised to 140 to 150° C., at which the mixture was aged under reflux for 2 hours. After confirming disappearance of the IR absorption at 2250 cm$^{-1}$ assigned to an isocyanate, the temperature was further elevated up to 200° C., at which the solvent was removed under atmospheric pressure for 2 hours. The solvent was further removed at 190 to 200° C. under reduced pressure of 50 to 60 mmHg for 1 hour to give a pale white solid.

PREPARATION EXAMPLES 17 TO 20

Curing Agent Compositions of Examples 1-16 to 1-18 and Comparative Example 1-2

Curing agent compositions were prepared in accordance with the formulations shown in Table 3 in the same manner as in Preparation Example 1.

PREPARATION EXAMPLE 21

Curing Agent Composition of Example 1-19

In a reactor were put 202 g of xylene, 75.4 g (0.65 mol) of hexamethylenediamine, and 132.6 g (1.3 mol) of dimethylaminopropylamine, and the mixture was stirred at 120° C. for 30 minutes. To the mixture was added dropwise 26 g (0.065 mol) of tetraglycidyl m-xylylenediamine (epoxy equivalent: 100), followed by aging under reflux for 3 hours. To the reaction mixture was further added dropwise 570 g (2.10 mol) of diglycidyl o-toluidine (epoxy equivalent: 135), followed by aging for 3 hours to give a polyamine-epoxy adduct (active hydrogen equivalent: 1350) as a brown liquid.

In a reactor were put 888 g of xylene and 204 g (2 mol) of dimethylaminopropylamine, followed by stirring at 80° C. for 30 minutes. To the mixture was added dropwise 666 g of a 67% xylene solution of isophorone diisocyanate (2 mol), followed by aging under reflux at 100° C. for 1 hour. To the reaction mixture was added dropwise 174 g (1 mol) of adipic acid dihydrazide, followed by refluxing at 130° C. for 3 hours. After confirming disappearance of the IR absorption at 2250 cm$^{-1}$ assigned to an isocyanate, 462 g of the above-prepared polyamine-epoxy adduct was added thereto, followed by stirring at 130° C. The temperature was raised up to 200° C., at which the solvent was removed under atmospheric pressure for 2 hours. The solvent was further removed at 190 to 200° C. under reduced pressure of 50 to 60 mmHg for 1 hour to give a pale yellow solid.

Epoxy resin compositions comprising the above-prepared curing agent compositions were evaluated as follows. The results obtained are shown in Tables 1 through 3.

1) Curability

Adeca Resin EP-4901E (bisphenol F type epoxy resin, available from Asahi Denka Kogyo K.K.) and the curing agent composition were mixed at a ratio of 100/20 and kneaded on a three-roll mill. The gel time (the time when the resulting composition lost stringiness) at a prescribed temperature was measured with a gelation tester.

2) Stability

Adeca Resin EP-4901E and the curing agent composition were mixed at a ratio of 100/20 and kneaded on a three-roll mill. The composition was allowed to stand at 25° C. for 3 hours, and the viscosity (poise) was measured at 25° C. (initial viscosity). The composition was further allowed to stand at 40° C., and the viscosity (poise) was measured with time.

3) Tensile Test

Adeca Resin EP-4901E and the curing agent composition were mixed at a ratio of 100/20 and kneaded on a three-roll mill. The resulting composition was used as an adhesive for lap joining two soft steel plates SPCC-SD (supplied by Nippon Test Panel) of 25 mm in width, 100 mm in length and 1.6 mm in thickness. The adhesive was applied to a 25 mm×10 mm lap and heated at 150° C. for 1 hour. The resulting test piece was pulled at a speed of 50 mm/min at 23° C. to measure a shear force (kgf/cm$^2$).

4) Tear Test

The same test piece as prepared in the tensile test (3) was pulled at a speed of 200 mm/min at 23° C. to measure a T-peel strength (kgt/cm$^2$).

5) Softening Point

Adeca Resin EP-4901E and the curing agent composition were mixed at a ratio of 100/20 and kneaded on a three-roll mill. The softening point of the resulting composition was measured with Melting Pointer, supplied by Meiho Co., ltd.

6) Glass Transition Point (Tg)

Adeca Resin EP-4901E and the curing agent composition were mixed at a ratio of 100/20 and kneaded on a three-roll mill. The resulting composition was subjected to differential thermoanalysis with a differential calorimeter, supplied by Seiko Electronic Components Ltd. The sample was heated at a rate of 100° C./min up to 150° C., at which it was kept for 1 hour, and then cooled at a rate of 100° C./min to 50° C. The sample was again heated up to 200° C. at a rate of 5° C./min. The glass transition point was obtained from the inflexion point of the resulting curve.

In Tables 1 to 3,

ADH: adipic acid dihydrazide 1,3-BIC: 1,3-bisisocyanato methylcyclohexane (67% toluene solution)

TDI: tolylene diisocyanate (67% toluene solution)

GOT: diglycidyl o-toluidine

TETRAD: tetraglycidyl m-xylylenediamine

Adeca Resin EP-4900: bisphenol A type epoxy resin, available from Asahi Denka Kogyo K. K.

TABLE 1

| Curing Agent Formulation (g) | Examples | | | | | | |
|---|---|---|---|---|---|---|---|
|  | 1-1 | 1-2 | 1-3 | 1-4 | 1-5 | 1-6 | 1-7 |
| ADH | 87 | 174 | 87 | 87 | 70 | 113 | 87 |
| Isophoronediamine | 85 |  |  |  |  |  |  |
| m-Xylylenediamine |  |  | 68 |  |  |  |  |
| Hexamethylenediamine |  |  |  | 58 | 46 | 75 | 58 |
| 1,2-Diaminopropane |  |  |  |  |  |  |  |
| Dimethylaminopropylamine | 204 | 204 | 204 | 204 | 245 | 143 | 204 |
| GOT |  |  |  |  |  |  |  |
| TETRAD |  |  |  |  |  |  |  |
| Isophorone Diisocyanate | 666 | 666 | 666 | 666 | 666 | 666 | 533 |
| 1,3-BIC |  |  |  |  |  |  |  |
| TDI |  |  |  |  |  |  |  |
| Isophoronediamine |  |  |  |  |  |  |  |
| Hexamethylenediamine |  |  |  |  |  |  |  |
| Dimethylaminopropylamine |  |  |  |  |  |  |  |
| TETRAD |  |  |  |  |  |  |  |
| GOT |  |  |  |  |  |  |  |
| Adeca Resin EP-4100 |  |  |  |  |  |  |  |
| Evaluation |  |  |  |  |  |  |  |
| Curability (min) |  |  |  |  |  |  |  |
| 80° C. | 32 | 60< | 31 | 29 | 31 | 29 | 28 |
| 100° C. | 5 | 60< | 4 | 5 | 7 | 2 | 1 |
| 120° C. | <0.5 | 60< | <0.5 | <0.5 | <0.5 | <0.5 | <0.5 |
| 150° C. | <0.5 | <0.5 | <0.5 | <0.5 | <0.5 | <0.5 | <0.5 |
| Stability (P/25° C.) |  |  |  |  |  |  |  |
| initial | 80 | 75 | 82 | 81 | 74 | 86 | 84 |
| 40° C. × 7 dys | 89 | 80 | 92 | 86 | 79 | 92 | 101 |
| 40° C. × 14 dys | 122 | 108 | 124 | 119 | 99 | 128 | 139 |
| Shear Force | 224 | 215 | 221 | 218 | 224 | 230 | 229 |
| T-peel Strength | 1.95 | 1.90 | 1.95 | 1.95 | 1.95 | 1.99 | 1.98 |
| Softening Point (° C.) | 145 | 149 | 142 | 141 | 145 | 150 | 148 |
| Tg (° C.) | 91 | 95 | 91 | 90 | 91 | 93 | 93 |

TABLE 2

| Curing Agent Formulation (g) | Example | | | | | | |
|---|---|---|---|---|---|---|---|
| | 1-8 | 1-9 | 1-10 | 1-11 | 1-12 | 1-13 | 1-14 |
| ADH | 87 | 87 | 87 | 87 | 87 | 87 | 87 |
| Isophoronediamine | | 85 | 85 | 85 | | 85 | 85 |
| m-Xylylenediamine | | | | | | | |
| Hexamethylenediamine | | | | | 58 | | |
| 1,2-Diaminopropane | 37 | | | | | | |
| Dimethylaminopropylamine | 204 | 204 | 204 | 204 | 240 | 240 | 240 |
| GOT | | | | | | | |
| TETRAD | | | | | | | |
| Isophorone Diisocyanate | 666 | | | 666 | 666 | 666 | 666 |
| 1,3-BIC | | 582 | | | | | |
| TDI | | | 522 | | | | |
| Isophoronediamine | | | | | | | 170 |
| Hexamethylenediamine | | | | 116 | 116 | 116 | |
| Dimethylaminopropylamine | | | | 204 | 204 | 204 | 204 |
| TETRAD | | | | | | | |
| GOT | | | | 540 | 540 | | 540 |
| Adeca Resin EP-4100 | | | | | | 760 | |
| Evaluation | | | | | | | |
| Curability (min) | | | | | | | |
| 80° C. | 32 | 32 | 15 | 10 | 10 | 10 | 10 |
| 100° C. | 6 | 2 | 1 | 1 | 1 | 1 | 1 |
| 120° C. | <0.5 | <0.5 | <0.5 | <0.5 | <0.5 | <0.5 | <0.5 |
| Stability (P/25° C.) | | | | | | | |
| initial | 81 | 80 | 84 | 75 | 74 | 76 | 78 |
| 40° C. × 7 dys | 91 | 95 | 91 | 90 | 88 | 91 | 93 |
| 40° C. × 14 dys | 128 | 134 | 136 | 135 | 132 | 134 | 131 |
| Shear Force | 223 | 222 | 216 | 213 | 212 | 216 | 220 |
| T-peel Strength | 1.93 | 1.90 | 1.92 | 1.83 | 1.82 | 1.89 | 1.90 |
| Softening Point (° C.) | 145 | 143 | 140 | 115 | 113 | 121 | 119 |
| Tg (° C.) | 90 | 91 | 91 | 89 | 90 | 89 | 90 |

TABLE 3

| Curing Agent Formulation (g) | Example | | | | | Comp. Example | |
|---|---|---|---|---|---|---|---|
| | 1-15 | 1-16 | 1-17 | 1-18 | 1-19 | 1-1 | 1-2 |
| ADH | 174 | 174 | 174 | 174 | 174 | | |
| Isophorone diamine | 170 | | | 170 | | 170 | 340 |
| m-Xylylenediamine | | 136 | | | | | |
| Hexamethylene diamine | | | 116 | | | | |
| 1,2-Diaminopropane | | | | | | | |
| Dimethylamino propylamine | 408 | 408 | 408 | 408 | 204 | 204 | 408 |
| GOT | 486 | 486 | 486 | 486 | | | 486 |
| TETRAD | 40 | 40 | 40 | 40 | | | 40 |
| Isophorone Diisocyanate | 666 | 666 | 666 | | 666 | 666 | 666 |
| 1,3-BIC | | | | 582 | | | |
| TDI | | | | | | | |
| Isophoronediamine | | | | | | | |
| Hexamethylenediamine | | | | | 35 | | |
| Dimethylaminopropylamine | | | | | 61 | | |
| TETRAD | | | | | 12 | | |
| GOT | | | | | 400 | | |
| Adeca Resin EP-4100 | | | | | | | |
| Evaluation | | | | | | | |
| Curability (min) | | | | | | | |
| 80° C. | 10 | 10 | 10 | 10 | 10 | 30 | 10 |
| 100° C. | 1 | 1 | 1 | 1 | 1 | 2 | 1 |
| 120° C. | <0.5 | <0.5 | <0.5 | <0.5 | <0.5 | <0.5 | <0.5 |
| Stability (P/25° C.) | | | | | | | |
| initial | 77 | 77 | 76 | 75 | 75 | 90 | 90 |
| 40° C. × 7 dys | 89 | 95 | 93 | 92 | 90 | GEL | GEL |
| 40° C. × 14 dys | 127 | 130 | 130 | 128 | 125 | — | — |
| Shear Force | 213 | 219 | 215 | 210 | 212 | 210 | 213 |
| T-peel Strength | 1.83 | 1.83 | 1.83 | 1.87 | 1.87 | 1.53 | 1.47 |
| Softening Point (° C.) | 117 | 121 | 120 | 113 | 110 | 105 | 101 |
| Tg (° C.) | 89 | 89 | 89 | 89 | 89 | 88 | 85 |

As is apparent from the results shown in Tables 1 through 3, the epoxy resin compositions comprising (A) a polyepoxy compound and (B) a curing agent obtained by the reaction of (a) an N,N-dialkylaminoalkylamine, (b) a dicarboxylic acid dihydrazide, and (c) an organic polyisocyanate provides a one-pack curing system which exhibits excellent storage stability and quick cure and provides a cured product with excellent physical properties. The balance of these characteristics can be controlled by addition of amine compounds or epoxy compounds to the above components.

To the contrary, the comparative epoxy resin compositions containing a curing agent obtained by the reaction of an N,N-dialkylaminoalkylamine, a general polyamine, e.g., isophoronediamine, and an organic polyisocyanate have extremely poor storage stability while excellent in curing property.

What is claimed is:

1. A curing agent composition for an epoxy resin which comprises (B) a reaction product obtained by allowing to react (a) an amine compound represented by formula (I):

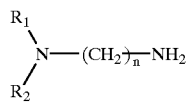

(I)

wherein $R_1$ and $R_2$ each represent an alkyl group having 1 to 8 carbon atoms, or $R_1$ and $R_2$ are connected together to form an alkylene group which may contain an oxygen atom or a nitrogen atom; and n represents 1 to 6,
(b) a polyamine compound comprising a dicarboxylic acid dihydrazide, (c) an organic polyisocyanate, and, optionally (d) an epoxy compound.

2. The curing agent composition according to claim 1, wherein said amine compound represented by formula (I) is dimethylaminopropylamine.

3. The curing agent composition according to claim 1, wherein said dicarboxylic acid dihydrazide is adipic acid dihydrazide.

4. The curing agent composition according to claim 1, wherein said organic polyisocyanate (c) is at least one compound selected from the group consisting isophorone diisocyanate, 1,3-bisisocyanato methylcyclohexane, and tolylene diisocyanate.

5. The curing agent composition according to claim 1, wherein said organic polyisocyanate (c) is used in an amount corresponding to 0.1 to 2 NCO groups per $NH_2$ group of the total of said monoamine compound (a) and said polyamine compound (b).

6. The curing agent composition according to claim 1, wherein said epoxy compound (d) is at least one compound selected from the group consisting of tetraglycidyl m-xylylenediamine and diglycidyl o-toluidine.

7. The curing agent composition according to claim 1, wherein said epoxy compound (d) is used in an amount corresponding to 0.9 or less epoxy group per $NH_2$ group of the total of said monoamine compound (a) and said polyamine compound (b).

* * * * *